(12) United States Patent
Lindquist et al.

(10) Patent No.: US 8,155,259 B2
(45) Date of Patent: Apr. 10, 2012

(54) APPARATUS AND METHOD FOR MEASURING AND SETTING PERPENDICULARITY OF AN UPPER TIE PLATE OF A NUCLEAR FUEL BUNDLE

(75) Inventors: Stephanie Baker Lindquist, Wilmington, NC (US); Russell Patrick Higgins, Wilmington, NC (US); David Grey Smith, Leland, NC (US); William Williams, Wilmington, NC (US); Edward G. Apple, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 762 days.

(21) Appl. No.: 12/272,242

(22) Filed: Nov. 17, 2008

(65) Prior Publication Data

US 2010/0124307 A1 May 20, 2010

(51) Int. Cl.
*G21C 17/00* (2006.01)
(52) U.S. Cl. .......................................... 376/258; 33/701
(58) Field of Classification Search ................. 376/258; 29/723; 33/701
See application file for complete search history.

(56) References Cited

U.S. PATENT DOCUMENTS

| | | | |
|---|---|---|---|
| 3,298,011 A * | 1/1967 | Lehnhardt | 340/659 |
| 5,978,430 A | 11/1999 | Peters et al. | |
| 6,125,160 A | 9/2000 | Gaylord et al. | |
| 6,310,930 B1 | 10/2001 | Peters et al. | |
| 6,333,957 B1 | 12/2001 | Peters et al. | |
| 6,539,073 B1 | 3/2003 | Smith et al. | |
| 6,765,979 B1 | 7/2004 | Dix et al. | |
| 2001/0004181 A1* | 6/2001 | Jaenker | 310/328 |
| 2001/0040419 A1* | 11/2001 | Behin et al. | 310/309 |
| 2001/0050801 A1* | 12/2001 | Behin et al. | 359/298 |
| 2001/0051014 A1* | 12/2001 | Behin et al. | 385/16 |
| 2002/0026831 A1* | 3/2002 | Behin et al. | 73/514.32 |

* cited by examiner

*Primary Examiner* — Ricardo Palabrica
(74) *Attorney, Agent, or Firm* — Nixon & Vanderhye P.C.

(57) ABSTRACT

An apparatus for measuring perpendicularity of an upper tie plate of a nuclear fuel bundle includes a first comb having a first plurality of teeth; a second comb having a second plurality of teeth, the second comb being parallel to and spaced from the first comb; a comb connector that connects the first comb to the second comb, the comb connector having a second end extending beyond the first comb; a rigid finger provided at the second end of the comb connector; a rotatable gage provided on the second comb; and a mobile finger operatively connected to the gage.

18 Claims, 8 Drawing Sheets

APPARATUS AND METHOD FOR MEASURING AND SETTING PERPENDICULARITY OF AN UPPER TIE PLATE OF A NUCLEAR FUEL BUNDLE

The present invention relates to an apparatus and method for measuring and for setting the perpendicularity of an upper tie plate of a nuclear fuel bundle.

BACKGROUND OF THE INVENTION

On a BWR fuel bundle, the upper tie plate (UTP) must be set perpendicular to the bundle's fuel rods to allow unrestricted rod growth during irradiation and to ensure an even load on each of the tie rod upper end plugs, which are used to support the bundle during lifting and/or for moving the nuclear fuel bundle around. Currently available UTP perpendicularity gages and set blocks have many issues that cause difficulty in achieving repeatable measurements. The currently available UTP perpendicularity gages yield unrepeatable measurements, even using a single inspector and a single gage.

The currently available UTP perpendicularity gages measure the perpendicularity of the UTP with respect to a single rod within the nuclear fuel bundle. If that fuel rod is bowed, the UTP is repeatedly set incorrectly without taking into consideration the many other fuel rods within the same bundle. The currently available gages are also difficult to use on the bundle sides while the bundle is in the horizontal position.

Additionally, because the single rod being measured is flexible, the inspector can inadvertently rotate or twist the gage handle slightly and the rod the gage rides upon can be moved, yielding an inaccurate perpendicularity reading. Tolerances on the UTP perpendicularity are typically small, e.g. ±0.007 in., and it is easy for two or more people to achieve readings that are different when measuring the same piece. All of these gage issues yield a very technique-driven gage and a high potential for operator error during usage.

Furthermore, the UTP perpendicularity is set while the nuclear fuel bundle is horizontal on the assembly table. In this position, the last support block under the nuclear fuel bundle lies 24-26 inches from the UTP allowing the bundle head to droop a minimum of 0.125 inches due to the weight of the UTP and flexibility of the rods. With the thinner cladding of some nuclear fuel rods, this becomes even more of an issue.

BRIEF DESCRIPTION OF THE INVENTION

According to one embodiment, an apparatus for measuring perpendicularity of an upper tie plate of a nuclear fuel bundle comprises a first comb having a first plurality of teeth; a second comb having a second plurality of teeth, the second comb being parallel to and spaced from the first comb; a comb connector that connects the first comb to the second comb, the comb connector having a second end extending beyond the first comb; a rigid finger provided at the second end of the comb connector; a rotatable gage provided on the second comb; and a mobile finger operatively connected to the gage.

DETAILED DESCRIPTION OF THE INVENTION

Figure 1:
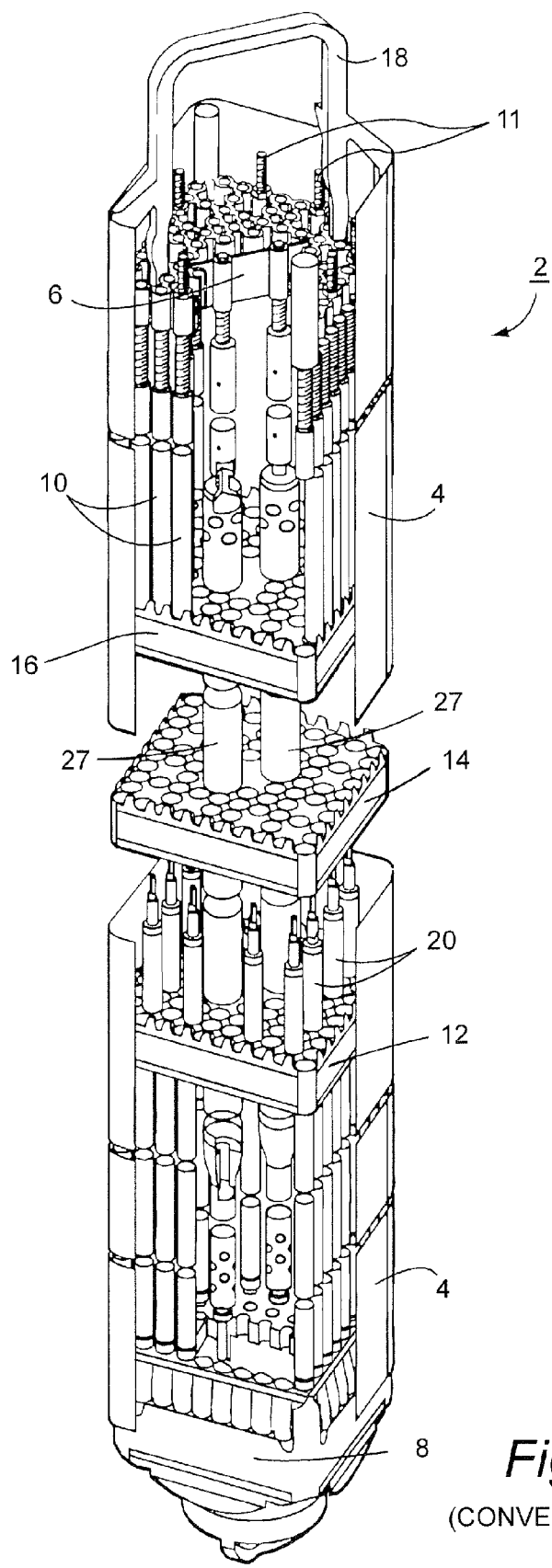
FIG. 1 is a schematic illustration of a nuclear fuel bundle.

Referring to FIG. 1, a nuclear fuel bundle 2 comprises a channel 4 encompassing an upper tie plate 6 and a lower tie plate 8. Within the channel 4 there is provided a plurality of nuclear fuel rods 10 and a pair of water rods 27 supported on the lower tie plate 8. The nuclear fuel rods 10 extend upwardly toward and to the upper tie plate 6. A plurality of spacers 12, 14, 16 are vertically spaced one from the other throughout the height of the nuclear fuel bundle 2 and define discrete, vertically aligned openings at lattice positions in a regular array of such openings to receive and confine the rods 10 within the nuclear fuel bundle 2 against lateral movement relative to one another. It should be appreciated that, generally, eight or nine spacers are provided, although only three spacers 12, 14, 16 are illustrated.

It will be appreciated that FIG. 1 illustrates a 9×9 array of nuclear fuel rods 10, but that other arrays may be utilized with the present invention, e.g., 8×8 or 10×10 arrays. A handle 18 is integrated into the top portion of the upper tie plate 6, and provides a means for lifting and moving the nuclear fuel bundle 2 relative to a nuclear fuel core (not shown).

In utilizing the nuclear fuel bundle 2 in the core of a nuclear reactor, for example a BWR, coolant/moderator, e.g., water, enters through the lower tie plate 8 for flow upwardly and about the rods 10. During upward passage of this water, steam is generated and a vapor and liquid mixture passes upwardly through the upper tie plate 6. During steam generation, the channel 4 confines the coolant/moderator flow within the nuclear fuel bundle 2 and isolates that flow from a core bypass volume flowing outside the channel 4 and between similarly disposed fuel bundles.

As shown in FIG. 1, not every lattice position of the lattice or array of openings across the spacers 12, 14, 16 is occupied by a full-length fuel rod 10. For example, one or more water rods 27 or moderator rods may pass upwardly through the central portion of the nuclear fuel bundle 2 and occupy a number of lattice positions. Additionally, one or more part-length rods 20 may be provided in selected lattice positions in the nuclear fuel bundle 2. Thus, for example, each part-length rod 20 may extend from the lower tie plate 8 upwardly in the fuel bundle through a spacer, for example the spacer 12, and terminate just above the spacer 12. Part-length rods 20 are typically terminated just above the spacer to provide support for the otherwise cantilevered ends of the part-length rod.

Figure 2:
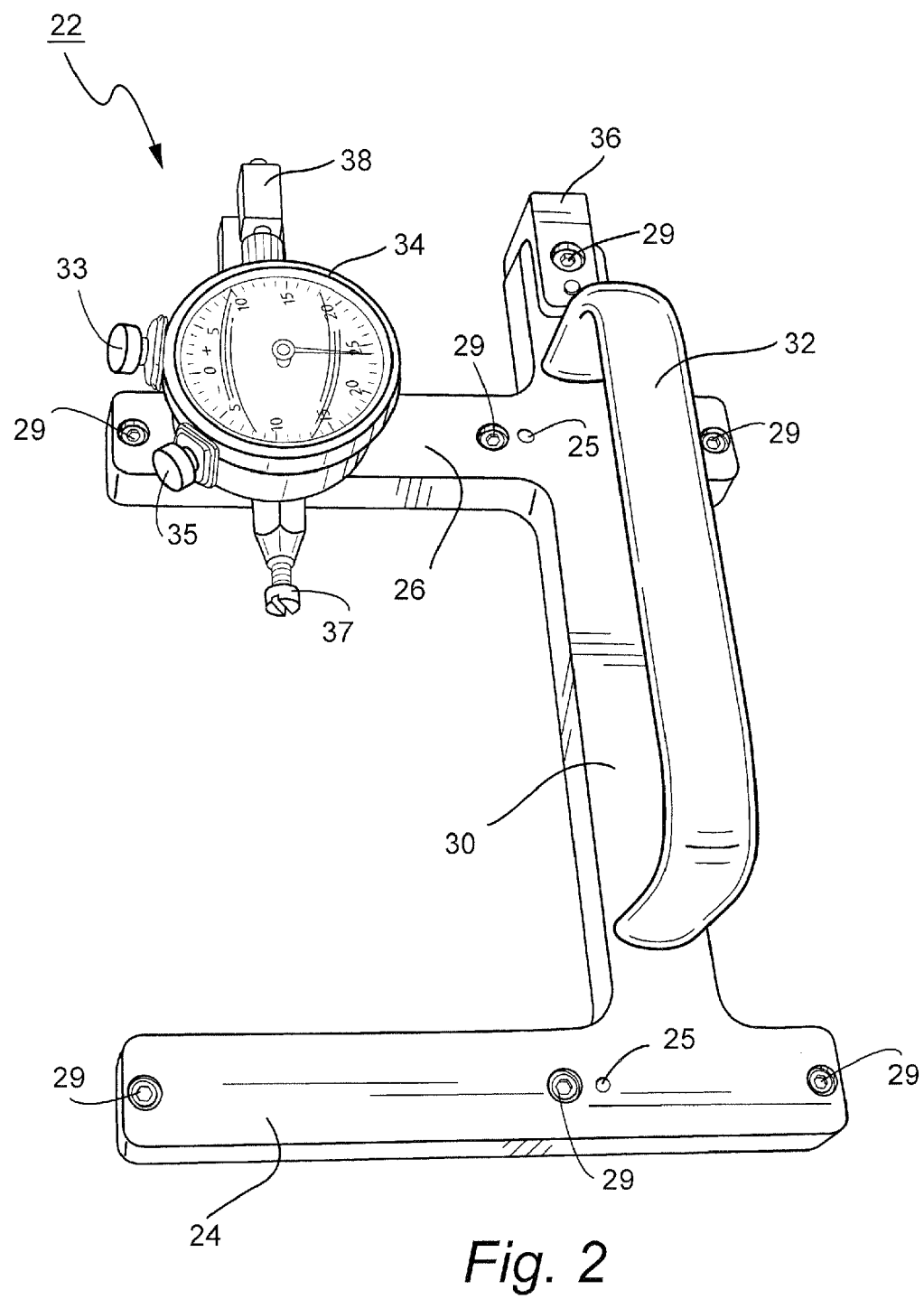
FIG. 2 is a schematic illustration showing part of an upper tie plate perpendicularity measurement system according to an embodiment of the invention as seen from a top perspective.

Referring to FIG. 2, an upper tie plate perpendicularity measuring apparatus 22 comprises a first comb 24 and a second comb 26 connected by a comb connector 30. A handle 32 on the upper tie plate perpendicularity measuring apparatus 22 is provided along the comb connector 30 for ease of usage. The second comb 26 supports a dial indicator gage 34 that is operatively connected to a mobile finger 38. It should be appreciated that the gage 34 may be a digital gage. The mobile finger 38 is pivotally connected to the dial indicator gage 34 and has a generally L-shaped configuration. At the end of the comb connector 30, a rigid finger 36 is provided and secured to the comb connector 30. First fasteners 29 may be used to secure the handle 32 to the comb connector 30, and the first and second combs 24, 26 are assembled and secured to the framework of the upper tie plate perpendicularity gage 22 by first fasteners 29 as well as dowel pins 25.

A rotational locking thumbscrew 35 may be provided to the dial indicator gage 34 to allow the operator/inspector to rotate the dial indicator gage 34 with respect to the second comb 26, wherein the gage is configured to be selectively fixed at a plurality of positions with respect to the second comb. A button 33 may also be provided to the dial indicator gage 34 to permit the operator/inspector to save measurements made by the dial indicator gage. The dial indicator gage 34 may comprise a memory that is configured to save certain data. Data may be entered and removed from the dial indicator gage by, for example, a USB cable. Data such as the name of the operator/inspector, date and time, location, etc. may be entered into the memory of the dial indicator gage. The operator/inspector may depress the button 33 to save measurements made by the dial indicator gage 34. The measurements saved in the memory may be correlated to the other information saved in the memory so that it is possible to determine, for example, the time and date and/or location that the measurements were taken, and/or the operator/inspector that took the measurements.

Figure 3:
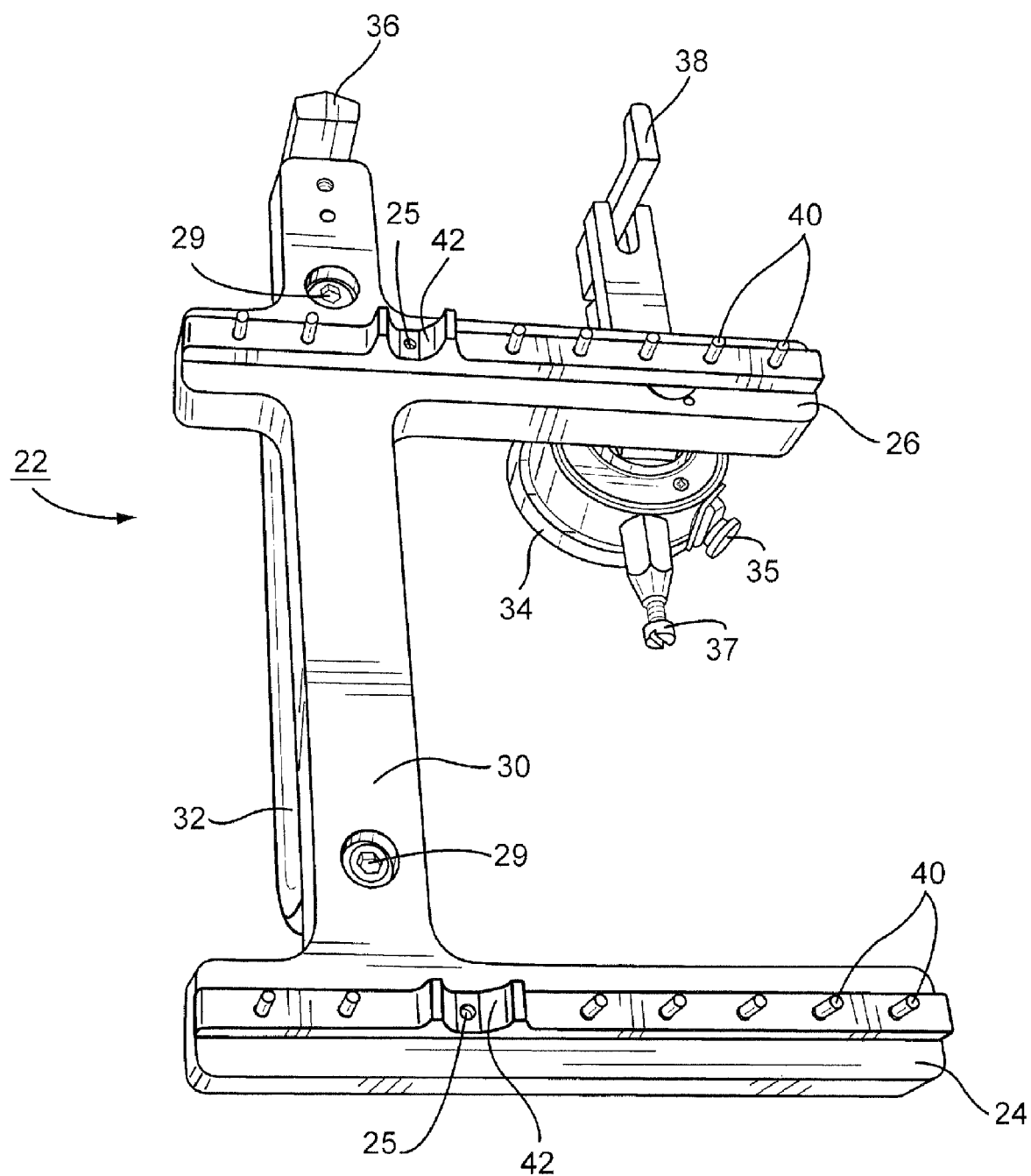
FIG. 3 is a schematic illustration showing part of the upper tie plate perpendicularity measurement system according to an embodiment of the invention as seen from a bottom perspective.

As shown in FIG. 3, the first and second combs 24, 26 comprise teeth 40 that are configured to encompass a fuel rod 10 of a nuclear fuel bundle 2 between adjacent teeth 40. The teeth 40 may comprise, for example, pins that are light press fit into the combs. The first and second combs 24, 26 also comprise indentations 42 that are configured to encompass a datum fuel rod location that aligns with an upper tie plate datum point(s).

The upper tie plate perpendicularity measuring apparatus 22 encompasses all of the nuclear fuel rods 10 (slightly beyond each of the rod's centerline) on a single side of the nuclear fuel bundle 2. The upper tie plate perpendicularity measuring apparatus 22 will take into consideration all of the fuel rods on a single side of the nuclear fuel bundle 2 when measuring the perpendicularity of the upper tie plate 6, thus eliminating problems caused by rod bow and/or operator or inspector bias caused by inadvertently rotating the handle 32 of the upper tie plate perpendicularity measuring apparatus 22.

The first and second combs 24, 26 are spaced to capture more of the rod length than current gages. The increased distance between the first and second combs 24, 26 allows for more accurate upper tie plate perpendicularity measurements. In addition, the first and second combs 24, 26 add stability during measurements of the sides of the nuclear fuel bundle 2 while the nuclear fuel bundle 2 is on a horizontal bundle assembly table. The first and second combs 24, 26 support the weight of the dial indicator gage 34 by resting on the rods of the bundle 2 and prevent the weight of the upper tie plate perpendicularity measuring apparatus 22 from becoming an impedance.

Figure 4:
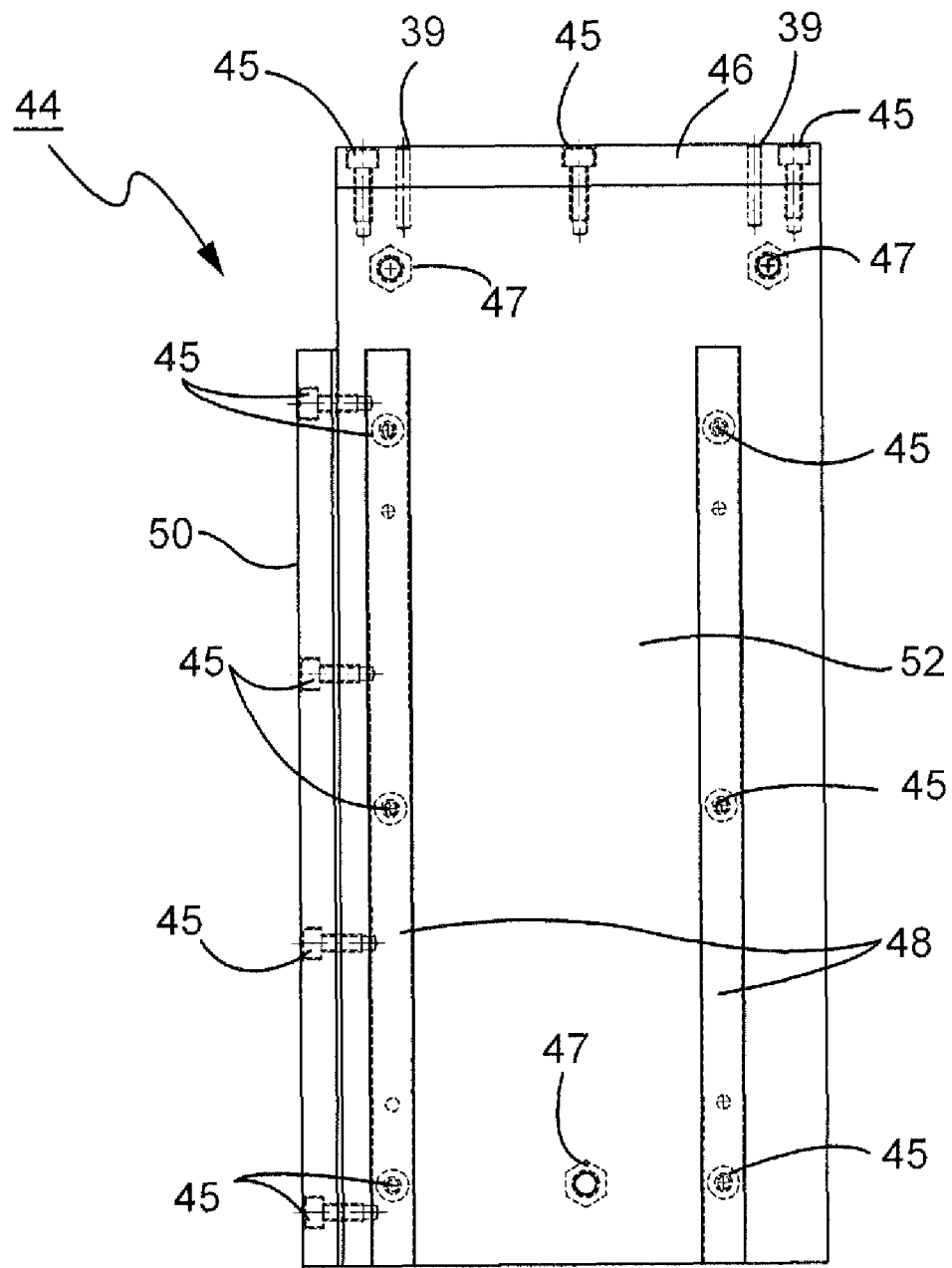
FIG. 4 is a schematic plan view of a set block usable with the upper tie plate perpendicularity measurement system.

Before the upper tie plate perpendicularity measuring apparatus 22 can be used, it must be zeroed on a set block 44, which along with the upper tie plate perpendicularity measuring apparatus 22 has to be certified as meeting all of the engineering and product requirements, shown in FIG. 4. If, after placing the upper tie plate perpendicularity measuring apparatus 22 upon the set block 44 and the dial indicator gage 34 does not zero, then a certified gage technician is required to make an adjustment using a fine adjustment point 37 on the dial indicator gage 34, to re-zero the gage to the set block 44 prior to usage. The set block 44 comprises a guide plate 52 and datum rods 48. A zero set plate 46 is provided at an end of the guide plate 52 and a side guide 50 is provided along a side of the guide plate 52. Second fasteners 45 and dowel pins 39 may be provided to secure the zero set plate 46, the datum rods 48, and the side guide 50 into place and upon the guide plate 52. Third fasteners 47 may be provided through the guide plate 52 to act as supports, or feet, for the set block to maintain the stability of the set block 44 during the certification of the gage. It should also be appreciated that the fasteners may be fastened to, for example, rubber feet. It should also be appreciated that the fasteners may be, for example, threaded fasteners, or projections fastened to the guide plate 52.

Figure 5:
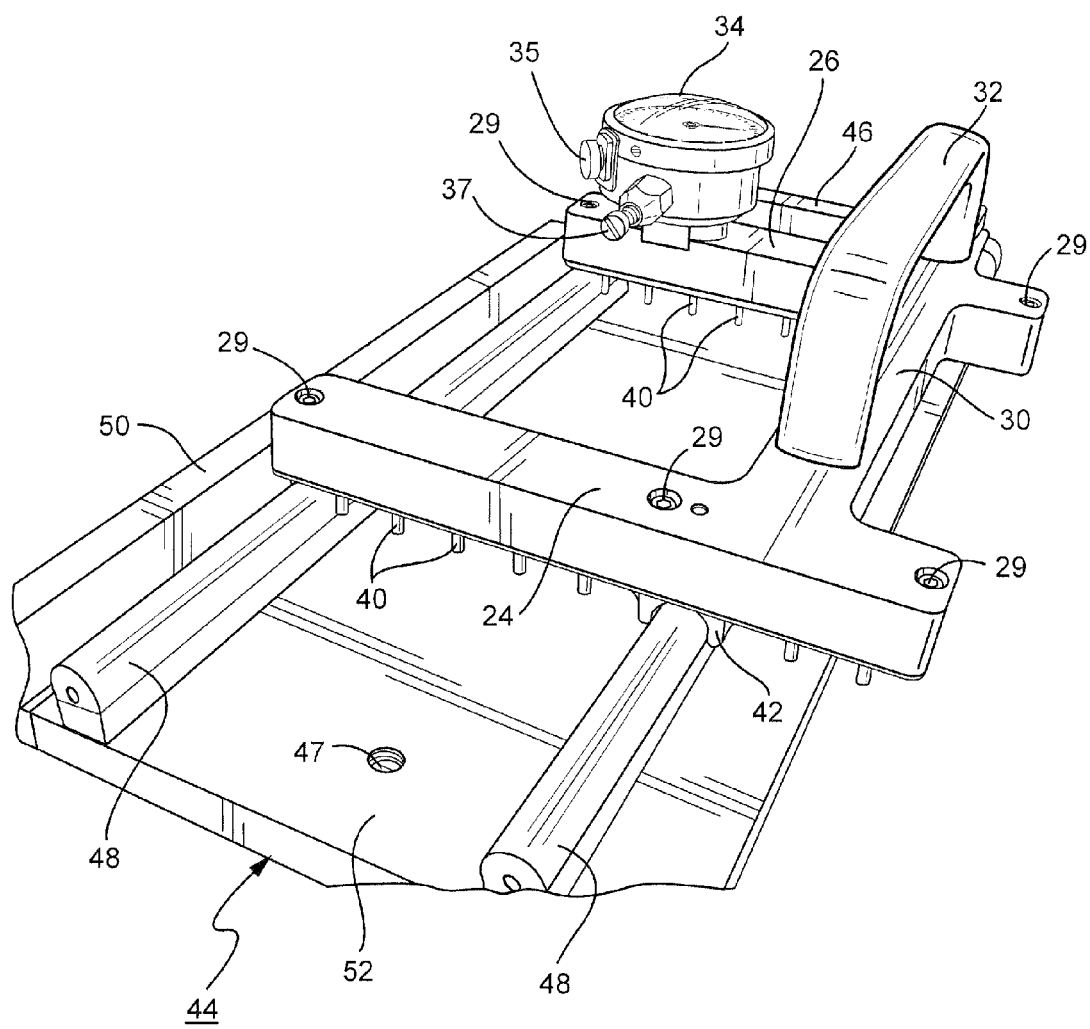
FIG. 5 is a schematic illustration showing part of the upper tie plate perpendicularity measurement system and the set block.

Referring to FIG. 5, the upper tie plate perpendicularity measuring apparatus 22 is placed on the set block 44 so that the indentations 42 of the first and second combs 24, 26 are resting on the datum rods 48 and the rigid finger 36 and the mobile finger 38 are pointed towards the zero set plate 46. The upper tie plate perpendicularity measuring apparatus 22 is slid toward the zero set plate 46 allowing the two fingers 36, 38 to touch the zero set plate 46 until the upper tie plate perpendicularity measuring apparatus 22 is fully seated. At this point, the fingers 36, 38 measure a plane that is exactly perpendicular to the datum rods 48 and the operator/inspector can verify that the dial indicator gage 34 is reading zero, otherwise a certified gage technician is required to make an adjustment using the fine adjustment point 37 on the dial indicator gage 34, as necessary to obtain a zero reading, prior to making any measurements.

Figure 6:
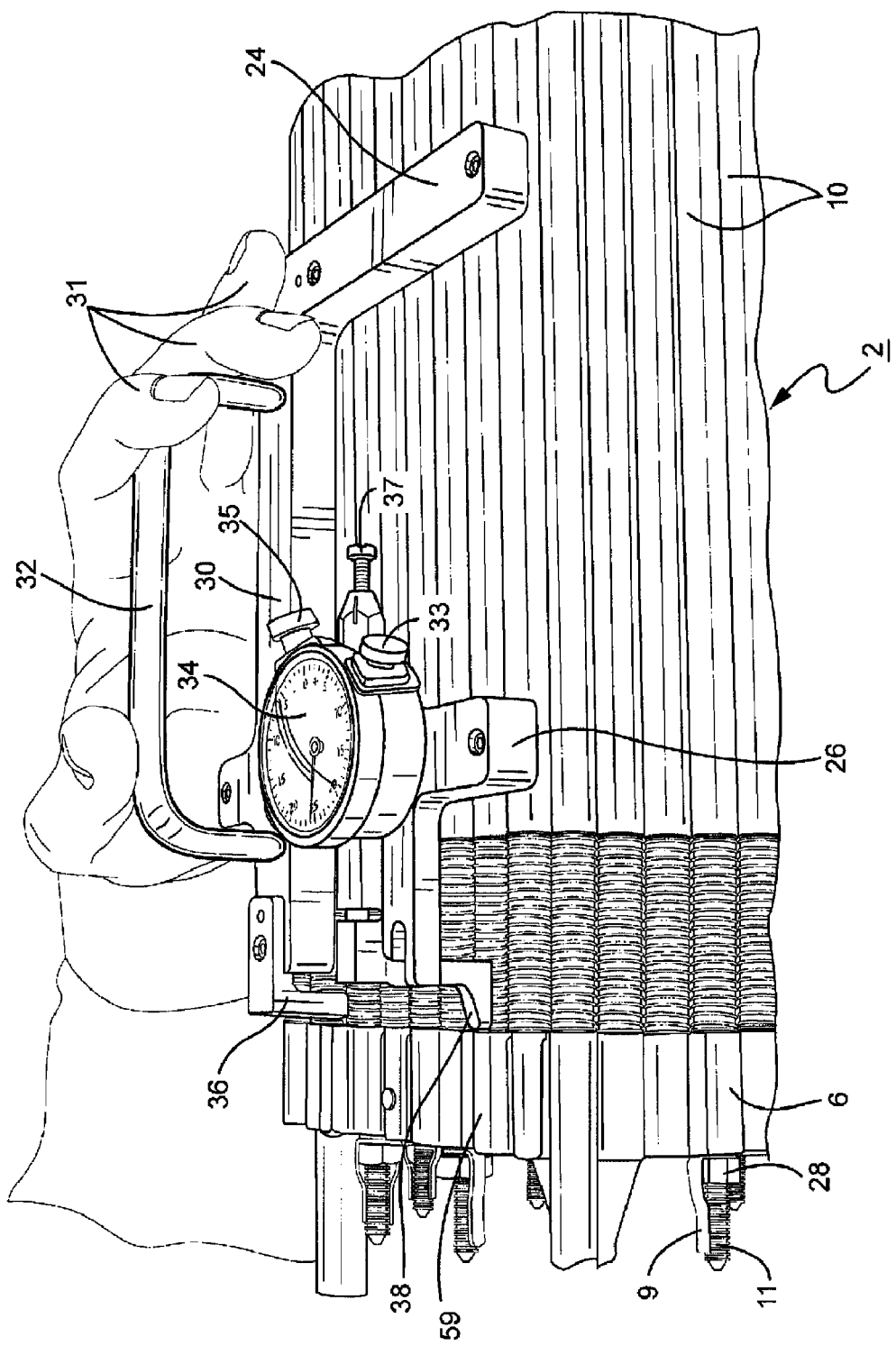
FIG. 6 is a schematic illustration showing part of the upper tie plate perpendicularity measurement system, resting upon, and a nuclear fuel bundle.

Referring to FIG. 6, in order to measure the perpendicularity of the upper tie plate 6, the upper tie plate perpendicularity measuring apparatus 22 is pressed against the fuel rods 10 of the nuclear fuel bundle 2 with the fingers 31 of the operator/inspector pointing towards the upper tie plate 6. Once the upper tie plate perpendicularity measuring apparatus 22 is seated on the nuclear fuel bundle 2, it is slid upward toward the upper tie plate's bottom surface until the rigid finger 36 and the mobile finger 38 touch the upper tie plate datum 59, i.e. protruding pieces on the sides of the upper tie plate 6. Loosening the dial indictor gage's rotational locking thumbscrew 35 will allow the operator/inspector to read the dial indicator gage 34 from any angle, for a more accurate reading without producing a parallax effect. The rigid finger 36 sets the position of the upper tie plate perpendicularity measuring apparatus 22 and the mobile finger 38, operatively connected to the dial indicator gage 34, is allowed to move up or down according to the position of the left datum stop with relation to the right datum stop. If the left datum stop is higher than the right datum stop, the dial indicator gage 34 will yield a positive reading, and vice versa. Based on the reading of the dial indicator gage 34, the hex nuts 28 (see FIG. 6) attached to each of the tie rods 11, on top of the upper tie plate 6, can be adjusted to change the perpendicularity of the upper tie plate 6 prior to installation of the lock tabs 9. The upper tie plate 6 is determined to be perpendicular when a zero gage reading is obtained on the dial indicator gage 34 on each of the four bundle sides. It should appreciated, however, that only three sides can be measured when the bundle is on the horizontal bundle assembly table, while all four sides are required to be re-verified at the final inspection stand.

Figure 7:
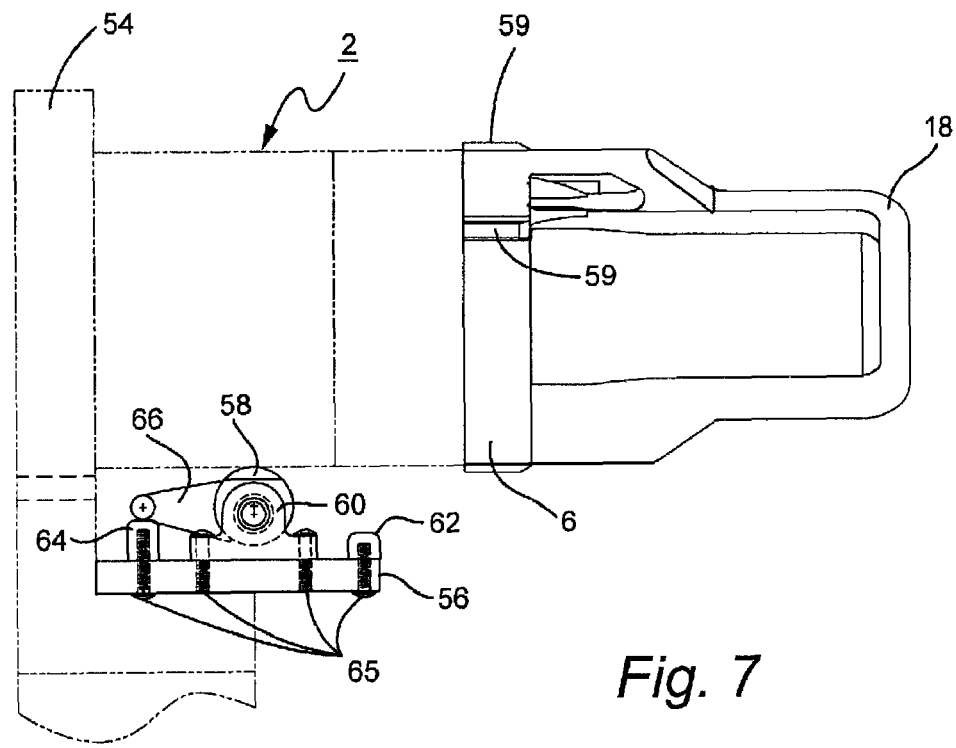
FIG. 7 is a schematic side elevation view of a semi-automated bundle assembly device in the up position.
Figure 8:
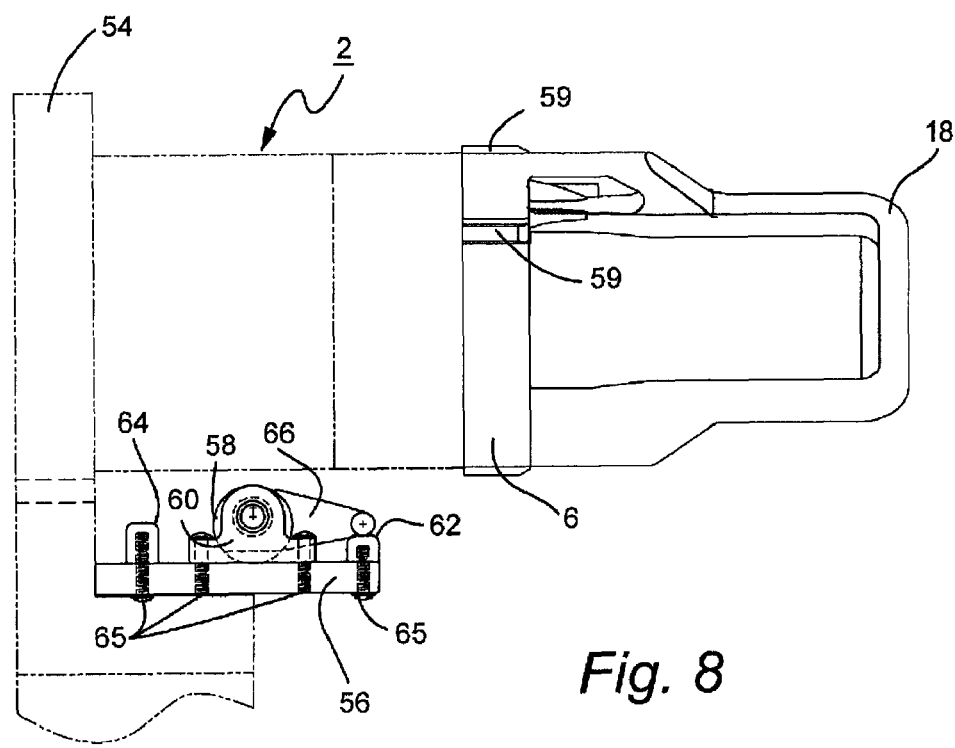
FIG. 8 is a schematic side elevation view of the semi-automated bundle assembly device in the down position.
Figure 9:
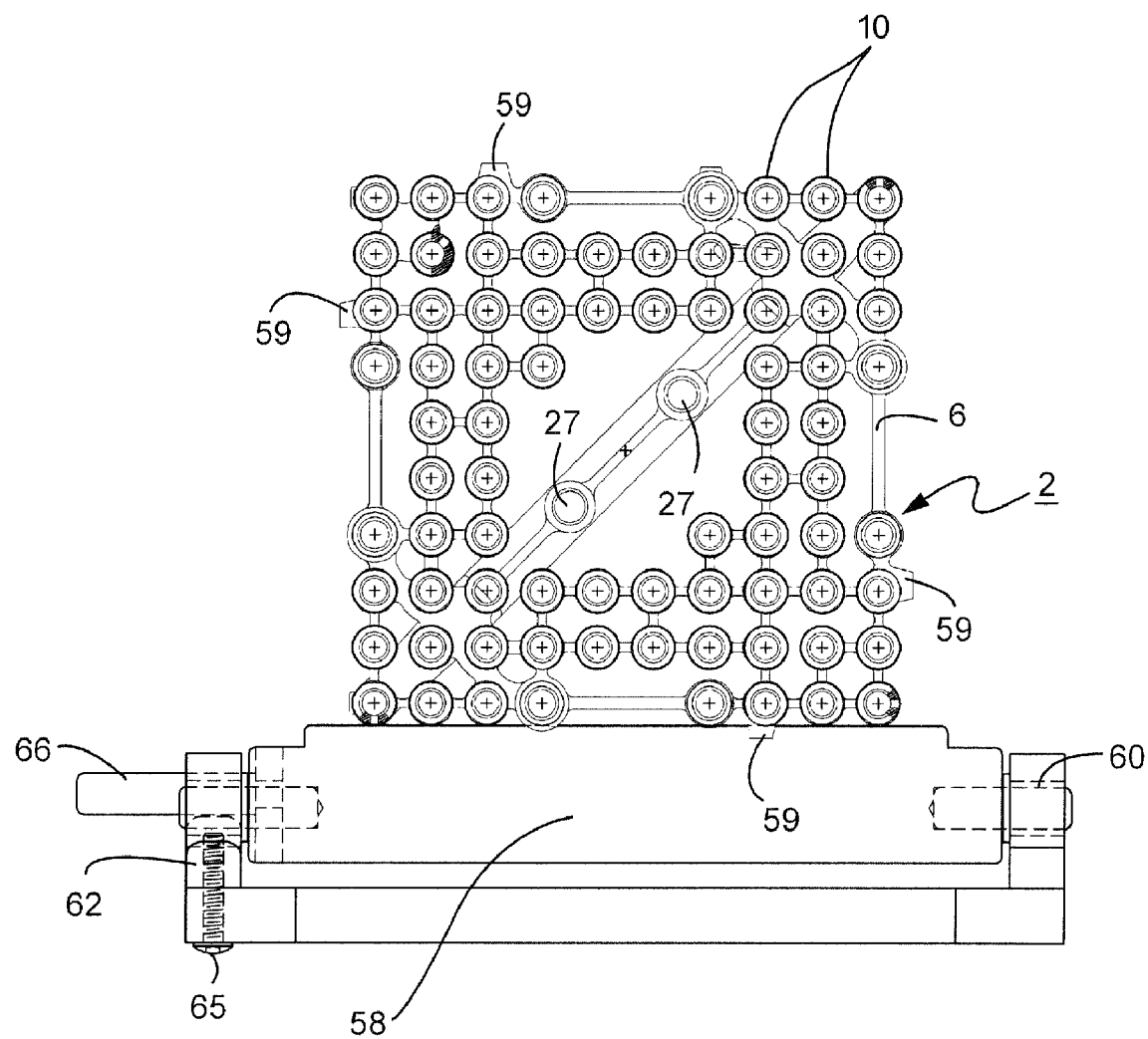
FIG. 9 is a schematic front elevation view of the automated bundle assembly machine.

Referring to FIGS. 7-9, a semi-automated bundle assembly rod lifting device 56 supports the nuclear fuel bundle 2 at the ends of the nuclear fuel rods to bring up the level of the rod's upper end plug and the upper tie plate 6 to be aligned with the rest of the nuclear fuel bundle 2. The opposite end of the nuclear fuel bundle 2 is supported by a rod guide support 54. The semi-automated bundle assembly rod lifting device 56 comprises an off-center toggle drum 58 that locks in the up position, shown in FIG. 7, to raise the end of the nuclear fuel bundle 2 to be perpendicular to the nuclear fuel rods. When in the down position, shown in FIG. 8, the rod guide support 54 is low enough to not contact the nuclear fuel rods of the nuclear fuel bundle 2, or impede assembly. Therefore, the rod guide support 54 can remain on the semi-automated bundle assembly rod lifting device 56 when not in use.

The semi-automated bundle assembly rod lifting device 56 comprises the off-center toggle drum device 58 that is supported in a bearing 60, configured to support a drum off-center and a toggle configured to rotate the off-center drum from a raised position to a lowered position. The off-center toggle drum 58 may be moved from the up position shown in FIG. 7 to the down position shown in FIG. 8 by lift roll (or drum) lever, or toggle, 66. The lift roll lever, or toggle, 66 is in contact with an up stop 64 in the up position shown in FIG. 7 and in contact with a down stop 62 shown in a down position of FIG. 8. Fourth fasteners 65 are used to secure the semi-automated bundle assembly rod lifting device 56 and to fasten the semi-automated bundle assembly rod lifting device 56 to the rod guide support 54.

The upper tie plate perpendicularity gage allows repeatability of the upper tie plate perpendicularity measurements and reduces operator/inspector variability among measurements. The upper tie plate perpendicularity gage also allows consideration of all of the fuel rods of the nuclear fuel bundle on a single side for perpendicularity measurement, rather than consideration of just one rod.

The semi-automated bundle assembly rod lifting device includes the rod guide support for supporting the end of the bundle when setting the upper tie plate to ensure accurate setting of the upper tie plate. The upper tie plate perpendicularity gage is robust and may be used to inspect the upper tie plate perpendicularity in the bundle inspection stand and at a customer site.

The upper tie plate perpendicularity gage may also be used to inspect additional future fuel bundle designs. The distance between the two combs of the upper tie plate perpendicularity gage capture more of the rods overall length and add stability during measurements of the bundles sides while the bundle is on the horizontal bundle assembly table, and during a vertical inspection at the inspection stand, due to the multi-rod comb gage design.

The upper tie plate perpendicularity gage may also be used with little or no training required for both domestic and international customers to allow for correct usage of the gage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for measuring perpendicularity of an upper tie plate of a nuclear fuel bundle, having a plurality of fuel rods comprising:

a first comb having a first plurality of teeth;
a second comb having a second plurality of teeth, the second comb being parallel to and spaced from the first comb;
a comb connector that connects the first comb to the second comb, the comb connector having a second end extending beyond the first comb;
a rigid finger provided at the second end of the comb connector;
a gage provided on the second comb; and
a mobile finger operatively connected to the gage, wherein the first comb and the second comb are configured to encompass all of the fuel rods of the nuclear fuel bundle on a single side of the bundle.

2. An apparatus according to claim 1, further comprising a handle connected to the comb connector.

3. An apparatus according to claim 1, wherein the mobile finger is pivotally connected to the second comb.

4. An apparatus according to claim 1, wherein a zero position of the gage is adjustable.

5. An apparatus according to claim 1, wherein the gage is a dial indicator gage.

6. An apparatus according to claim 1, wherein the gage is rotatable with respect to the second comb.

7. An apparatus according to claim 6, wherein the gage is configured to be selectively fixed at a plurality of positions with respect to the second comb.

8. An apparatus according to claim 7, wherein the position of the gage is selectively fixed by a screw.

9. An apparatus according to claim 1, further comprising a semi-automated bundle assembly rod lifting device.

10. An apparatus according to claim 9, wherein the semi-automated bundle assembly rod lifting device comprises a rod guide support configured to support an end of the nuclear fuel bundle opposite the upper tie plate and an off-center toggle drum configured to raise and lower the end of the nuclear fuel bundle.

11. An apparatus according to claim 10, wherein the off-center toggle drum device comprises a bearing configured to support a drum off-center and a toggle configured to rotate the off-center drum from a raised position to a lowered position.

12. An apparatus according to claim 11, further comprising an up stop configured to engage the toggle in the raised position and a down stop configured to engage the toggle in the lowered position.

13. An apparatus according to claim 10, wherein the off-center toggle drum is fastened to the rod guide support.

14. An apparatus according to claim 1, further comprising a set block configured to zero the gage prior to measuring the perpendicularity of the nuclear fuel bundle.

15. An apparatus according to claim 14, wherein the set block comprises a guide plate, a zero set plate configured to engage the rigid finger and the mobile finger, and at least two datum rods configured to engage the first and second combs.

16. An apparatus according to claim 15, wherein one of the datum rods is configured to engage indentations of the first and second combs.

17. An apparatus according to claim 1, wherein the gage comprises a memory configured to store at least one of a time, date, operator/inspector name, and measurement.

18. An apparatus according to claim 17, wherein the gage comprises a user input device configured to allow the user to selectively save individual measurements in the memory.

* * * * *

UNITED STATES PATENT AND TRADEMARK OFFICE
CERTIFICATE OF CORRECTION

PATENT NO. : 8,155,259 B2  Page 1 of 1
APPLICATION NO. : 12/272242
DATED : April 10, 2012
INVENTOR(S) : Lindquist et al.

It is certified that error appears in the above-identified patent and that said Letters Patent is hereby corrected as shown below:

Column 5, line 19, after "toggle drum" delete "device"

Signed and Sealed this
Tenth Day of July, 2012

David J. Kappos
*Director of the United States Patent and Trademark Office*